Sept. 26, 1961 K. K. KING 3,001,386
UNIVERSAL JOINT
Filed Dec. 21, 1959
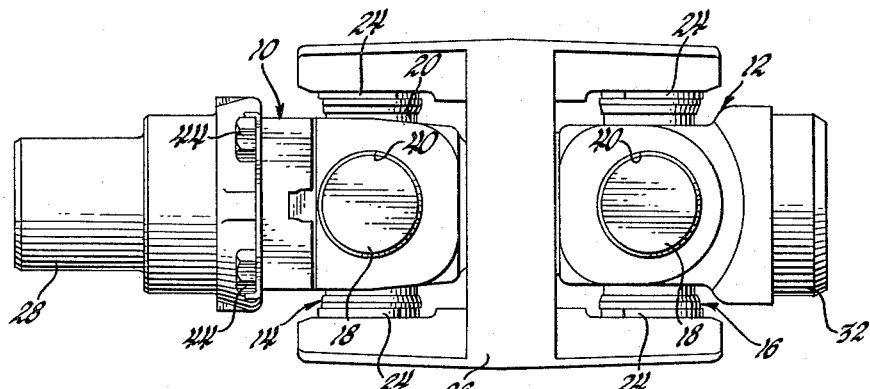
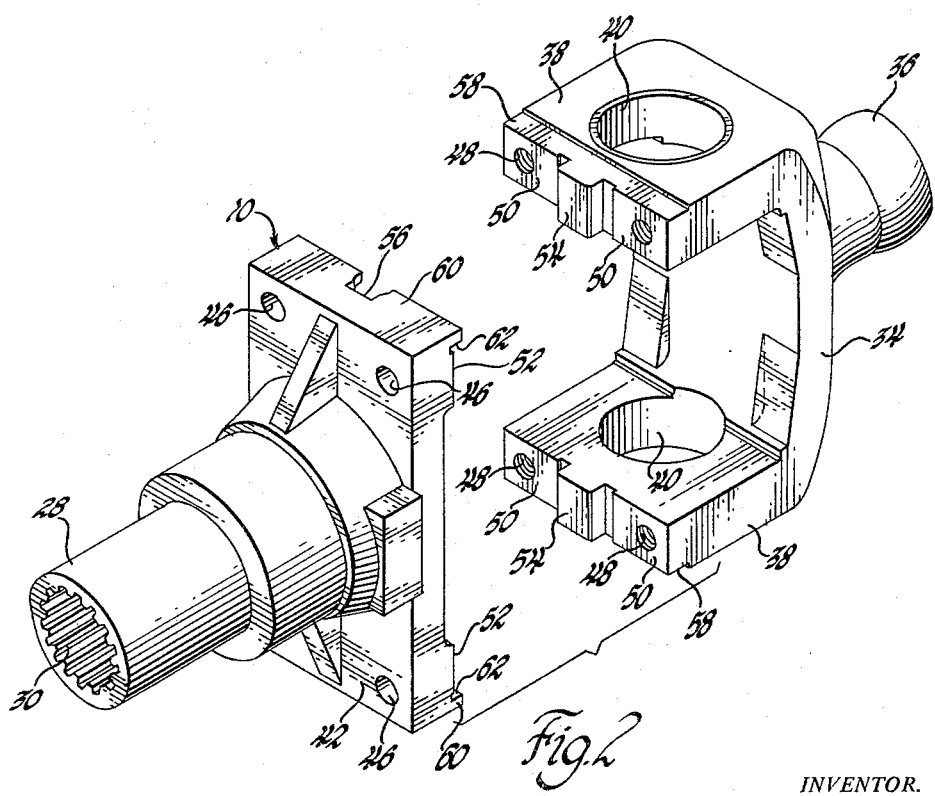
INVENTOR.
Kenneth K. King
BY
L. D. Burch
ATTORNEY

United States Patent Office 3,001,386
Patented Sept. 26, 1961

3,001,386
UNIVERSAL JOINT
Kenneth K. King, Saginaw, Mich., assignor to General Motors Corporation, Detroit, Mich., a corporation of Delaware
Filed Dec. 21, 1959, Ser. No. 860,896
1 Claim. (Cl. 64—17)

This invention relates to universal joints and more particularly to a means for constructing a double Cardan universal joint yoke for maximum rigidity and dimensional accuracy.

The usual double Cardan universal joint comprises a pair of yoke members carrying spider and bearing assemblies and spaced by a centering device of some sort. An H-shaped connecting member receives the proper arms of the spider and bearing assemblies and connects the two yokes, as well as enclosing the centering device. The input and output shafts of the universal joint are secured in some suitable manner to the yokes.

The conventional practice in constructing a particular universal yoke is to split the yoke along the centerline of the bearing cap, which is also the centerline of the spider and bearing assembly. The pieces are then joined by bolts, or the like, clamping the bearing cap therebetween. With a construction of this kind, the clamping members, by the force applied across the bearing cap or by the tolerances introduced in the manufacture of the yoke, determine the compressive load against the annulus of needle bearings. Obviously, a specific torque requirement is necessary on the bolts connecting the two members and it is easily seen that an excessive torque applied to the bolts will cause an early failure of the bearing assembly, and an insufficient amount of torque will permit the joint to loosen and the bearing cap and annulus of needle bearings may be lost.

The device in which this invention is embodied comprises a universal joint yoke which is separated along a plane spaced from the bearing cap receiving opening in the yoke. A dimensionally accurate fit is provided by a tab extending from one portion of the yoke and which is received in a slot formed in the adjoining portion of the yoke. A pair of flanges extending from one portion of the yoke and overlying the other provides dimensional stability in the opposite direction. Bolts, or other securing means, extend through one piece and into the other to secure the parts together.

The resulting universal joint yoke provides a design which is simple to manufacture and assemble and eliminates the clamping problems incident to the well-known types of universal joint yokes. The clamping action of the attaching bolts acts against solid metal across the connecting plane and does not distort the bearing cap receiving opening nor apply an unnecessary force thereon. The compressive load on the needle bearing is kept constant since the opening receiving the bearing cap cannot be changed.

These and other advantages will become more apparent from the following description and drawings in which:

FIGURE 1 is an illustration of a double Cardan universal joint and illustrating a yoke split outwardly of the bearing cap receiving opening.

FIGURE 2 is an exploded perspective view of the universal yoke of FIGURE 1.

Referring more particularly to the drawings, the complete universal joint is best illustrated in FIGURE 1. A pair of yoke members, illustrated generally by the numerals 10 and 12, receive the usual spider and bearing assemblies, illustrated generally by the numerals 14 and 16. A bearing cap 18 is received over each of the four arms of the spider 20 and extends through an opening 40 in the yoke 10 or 12. The bearing cap 18 may be press fit, or otherwise secured, in the yoke 10 or 12 and properly located on the spider 20 by a retaining ring 24, which also retains the annulus of needle bearings that are located between the cross arms of the spider 20 and the bearing caps 18.

In order to connect the yoke members 10 and 12, a generally H-shaped member 26 is provided which includes a plurality of openings to receive the proper portions of the spider and bearing assemblies 14 and 16. The bearing caps 18 are press fit, or otherwise secured, in the openings in the connecting member 26. The torque entering the joint from one end is transmitted to the other and through the connecting member 26.

The yoke 10 has a driveshaft receiving extension 28 formed on the end thereof, the extension having a plurality of internal splines 30 to receive an externally splined section of the driveshaft. A connection is made at the opposite end of universal yoke 12, wherein shaft extension 32 receives a tubular driveshaft member and a weldment utilized to join the parts.

Referring next to FIGURE 2, yoke 10 is more clearly illustrated to indicate the manner in which it is constructed. An end plate 34 extends transversely of the axis of the universal joint and has extending therefrom a shaft extension 36 which forms a part of the usual double Cardan universal joint centering means. A pair of side plates 38 extend from opposite ends of the end plate 34 in a direction substantially parallel to the axis of the universal joint. The side plates 38 have bearing cap receiving openings 40 formed therethrough, and it is to be particularly noted that the openings 40 are entirely within the confines of the side plates 38. The spider and bearing assembly extends between the side plates 38, and the bearing caps may be press fit in the openings 40, or otherwise secured therein.

A second end plate 42 is secured to the ends of the side plates 38 by bolts or the like 44, illustrated in FIGURE 1. The bolts pass through holes 46 in the end plate 42 and into the holes 48 in the ends of the side plates 38.

End plate 42 is properly spaced from end plate 34 by machined surfaces 50, formed on the ends of the side plates 38, and machine surfaces 52 formed on the end plate 42. These finished surfaces 50 and 52 may take the form of bosses, or the like, depending on manufacturing convenience. When the end plate 42 is secured to the side plates 38, the finished surfaces abut and properly space the parts.

A tab, or key, 54 is formed from each of the end plates 38 and extends toward the end plate 42. A pair of slots 56, only one of which is shown, receives the keys 54 to properly locate the end plate 42 in the lateral direction with respect to the side plates 38. The tabs 54 and slots 56 also properly align the shaft extension 28 with respect to the remainder of the joint.

A second series of finished surfaces are provided to accurately locate and align the end plate 42 with respect to the side plates 38 and the end plate 34. A portion 58 of the outer surface of the side plates 38, and between the ends of the side plates and the bearing cap receiving openings 40, is finished, in order to receive a flange 60 extending from each end of the end plate 42. The undersurface 62 of the flanges 60 are finished to properly engage the finished surfaces 58 on the side plates 38.

It is to be understood that the finished surfaces of the side plates 38 may be located on the inner side thereof, rather than the outer side, the outer side being shown for ease of illustration. If such were the case, suitable flanges would be formed from end plate 42 to engage such finished surfaces.

When the yoke 10 is assembled, as illustrated in FIG-

URE 1, the bosses or finished surfaces 50 and 52 engage each other and the tab 54 is received within the slot 56 to position the parts. At the same time, flanges 60 overlie the side plates 38 and the finished surfaces 58 and 62 engage to dimensionally align and locate the end plate 42 with the remainder of the yoke. Thus, the dimensions are controlled in several planes and it is easily seen that the clamping pressure applied by the bolts 44 in securing the end plate 42 to the side plates 38 is completely removed from the bearing cap receiving openings 40.

Thus, a universal joint yoke is provided which has a high degree of dimensional accuracy and eliminates any bearing cap and needle bearing distortion and, consequently, any failure as a result thereof.

What is claimed:

In a double Cardan universal joint a yoke comprising first and second end plates and a pair of side plates, said first end plate extending between said side plates and having centering means formed thereon, said side plates being integral with said first end plate and having aligned spider and bearing assembly receiving openings formed therethrough, a tab formed from the end of each of said side plates and extending toward said second end plate, said second end plate having an axial and internally splined bore formed therein, said second end plate being removably secured to and engaging the ends of said side plates and having slots formed therein to receive said tabs for aligning said second end plate with respect to said first end plate, a flange formed from each end of said second end plate, each of said flanges engaging a surface of one of said side plates beyond the end thereof to locate said second end plate with respect to said side plates, each of the engaging surfaces on said second end plate and said side plates being finished to provide dimensional accuracy in the securement of said second end plate to said side plates.

References Cited in the file of this patent

UNITED STATES PATENTS

| | | |
|---|---|---|
| 2,227,116 | Wollner | Dec. 31, 1940 |
| 2,259,657 | Padgett | Oct. 21, 1941 |
| 2,629,992 | Anderson | Mar. 3, 1953 |